(12) United States Patent
Kima

(10) Patent No.: US 6,508,738 B2
(45) Date of Patent: Jan. 21, 2003

(54) TRANSMISSION

(75) Inventor: Yasuo Kima, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/902,763

(22) Filed: Jul. 12, 2001

(65) Prior Publication Data

US 2002/0010050 A1 Jan. 24, 2002

(30) Foreign Application Priority Data

Jul. 18, 2000 (JP) ........................................ 2000-216915

(51) Int. Cl.[7] ................................................. F16H 3/44
(52) U.S. Cl. ........................ 475/312; 475/114; 475/121; 477/69; 477/80; 477/180
(58) Field of Search ................................. 475/312, 297, 475/114, 121, 123; 477/69, 75, 80, 169, 175, 180

(56) References Cited

U.S. PATENT DOCUMENTS

| | | | |
|---|---|---|---|
| 3,603,176 A | * | 9/1971 | Tipping et al. ............... 475/23 |
| 5,139,465 A | * | 8/1992 | Sato ........................... 475/24 |
| 5,890,988 A | * | 4/1999 | Kasuya et al. ............... 192/215 |
| 6,090,007 A | * | 7/2000 | Nakajima et al. ............. 477/15 |

FOREIGN PATENT DOCUMENTS

JP        11-13878        1/1999

\* cited by examiner

*Primary Examiner*—Sherry Estremsky
*Assistant Examiner*—Tisha D. Lewis
(74) *Attorney, Agent, or Firm*—Armstrong, Westerman & Hattori, LLP

(57) ABSTRACT

In a transmission which transmits a power from an electrical motor 1 to a countershaft 30 with a speed change, a drive side rotating member which is coupled to a main shaft 10 experiences a rotational change along with the main shaft 10 when a shift from a first speed ratio to a second speed ratio is executed, and an intermediate rotating member experiences a rotational change in a direction opposite to that of the drive side rotating member when the shift is executed. In this transmission, the ratio of the rotational inertia of the drive side rotating member to the rotational inertia of the intermediate rotating member equals the reciprocal of the ratio of the rotational change of the drive source to the rotational change of the intermediate rotating member, the rotational changes being experienced during the shift.

5 Claims, 5 Drawing Sheets

Fig. 3

|  | LOW | 2ND | 3RD |
|---|---|---|---|
| L-R CLUTCH (23) | ○ | × | × |
| 2ND CLUTCH (26) | × | ○ | × |
| 3RD CLUTCH (33) | × | × | ○ |
| 1-2 INERTIA CLUTCH (24) | × | ○ | × |
| 2-3 INERTIA CLUTCH (25) | × | × | ○ |
| SOL A (53) | ON | OFF | OFF |
| SOL B (54) | ON | OFF | ON |
| 1-2 OWC (21) | ○ | × | × |
| 2-3 OWC (22) | ○ | ○ | × |

TRANSMISSION

FIELD OF THE INVENTION

The present invention relates to a transmission which is designed to transmit a mechanical power from a drive source to a rotating output member with a rotational speed change.

BACKGROUND OF THE INVENTION

Gear type transmissions with combinations of gears have been used commonly as automobile transmissions. In general, such a gear type transmission comprises a plurality of gear trains with respective speed change ratios, each gear train constituting a corresponding power transmission path, and these power transmission paths are selected exclusively by actuating, for example, clutches which are arranged appropriately, for the speed ratio change of the transmission. As such a transmission, Japanese Laid-Open Patent Publication No. H11-13878 discloses a transmission used on an electric motorcar.

In such a transmission, the speed ratio change, which is executed by shifting or changing selectively the power transmission paths, takes a relatively short time, so the speed of the vehicle does not change much in such a short time, and the rotational speed of the output shaft of the transmission remains almost constant. However, when the speed change ratio of the transmission, i.e., the ratio of the rotational speeds of the output shaft and the input shaft, is changed or shifted, a corresponding change occurs in the rotational speed of the engine, which is coupled to the input shaft of the transmission. In this instance, the inertia of the engine experiencing the rotational speed change, exerts a torque to the output shaft, which may present a problem of "shift shock."

SUMMARY OF THE INVENTION

It is an object of the present invention to provide a transmission which is designed to limit the above described effect of the changing rotational speed of the engine, which affects the rotation of the output shaft during shift operations.

The present invention provides a transmission which transmits a power from a drive source (for example, the electrical motor 1 described in the following embodiment) to an output rotating member (for example, the countershaft 30 described in the following embodiment) with a speed change. In this transmission, a drive side rotating member (for example, the main shaft 10 and the rotating members connected thereto) which is coupled to the drive source experiences a rotational change along with the drive source when a shift from a first speed ratio (for example, a LOW speed ratio) to a second speed ratio (for example, a SECOND speed ratio) is executed, and an intermediate rotating member (for example, the sun gear 13 and the rotating members connected thereto) which is positioned between the drive side rotating member and the output rotating member experiences a rotational change in a direction opposite to that of the drive side rotating member when the shift is executed. It is a feature of the present invention that the ratio of the rotational inertia of the drive side rotating member to the rotational inertia of the intermediate rotating member equals the reciprocal of the ratio of the rotational change of the drive source to the rotational change of the intermediate rotating member, these rotational changes being experienced during the shift.

When the transmission is shifted from the first speed ratio to the second speed ratio, the rotational speed of the drive source changes correspondingly to the speed change ratio of the shift between these two speed ratios. Because the ratio of the rotational inertia of the drive side rotating member to the rotational inertia of the intermediate rotating member is set equal to the reciprocal of the ratio of the rotational change of the drive source to the rotational change of the intermediate rotating member, which changes occur during the shift, the energy involved in the rotational change of the drive side rotating member equals the energy involved in the rotational change of the intermediate rotating member during the shift, with the directions of the rotational changes of the drive side rotating member and the intermediate rotating member being opposite to each other. As a result, these energies can offset each other, so the energies of these rotational changes are not transferred to the output rotating member of the transmission. Thus, the effect of shift shock is restrained to realize a smooth shift operation for the transmission.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 3 is a table describing the relations between the engagement condition of the clutches and the speed change ratios of the transmission according to the present invention.

DESCRIPTION OF THE PREFERRED EMBODIMENTS

Figure 1:
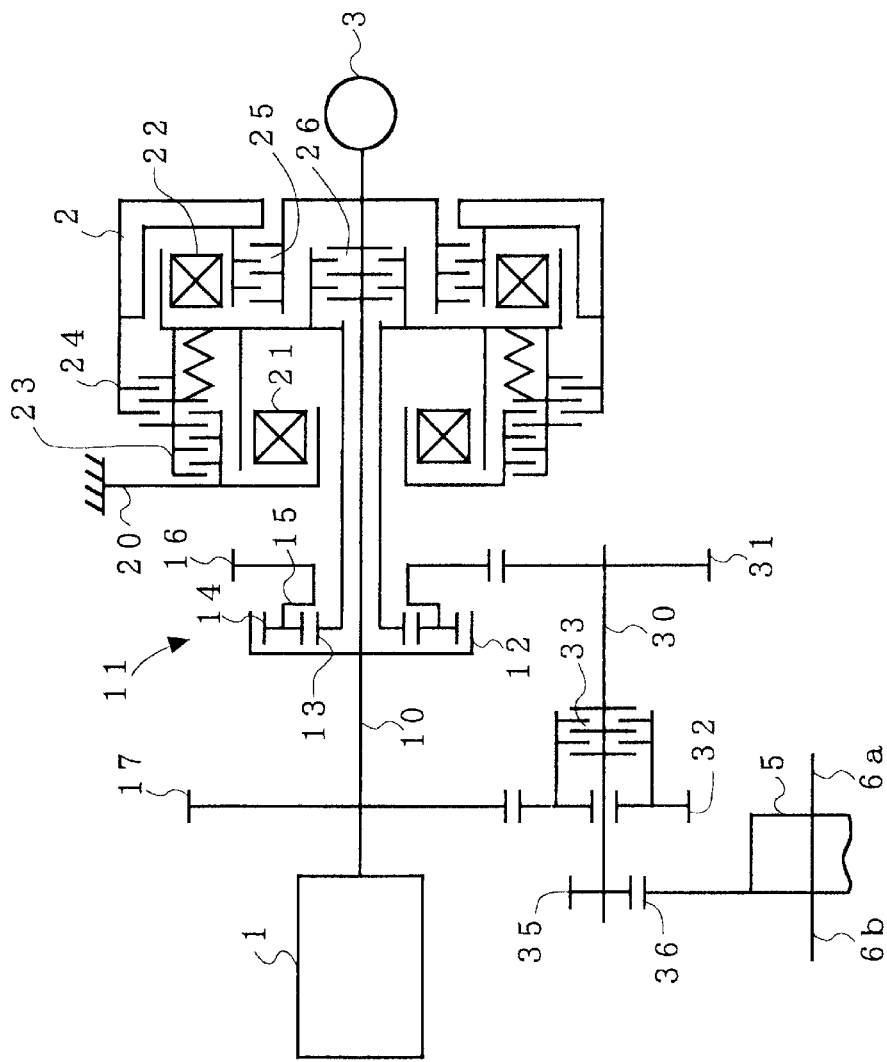
FIG. 1 is a schematic diagram illustrating generally the arrangement of the power transmission paths of a transmission according to the present invention.

A preferred embodiment according to the present invention is now described in reference to the drawings. FIG. 1 shows schematically the arrangement of the power transmission paths of a transmission according to the present invention. This transmission comprises an electrical motor 1 as a source of driving power. The main shaft 10 of the transmission is coupled with the output shaft of the electrical motor 1, and a hydraulic pump 3 is connected to the other end of the main shaft 10. Because of this construction, when the electrical motor 1 is operated, the main shaft 10 is driven to actuate the hydraulic pump 3.

On the main shaft 10, a THIRD drive gear 17 and a planetary gear train 11 are provided rightward in this order from the left end of the main shaft 10. The planetary gear train 11 comprises a ring gear 12, a sun gear 13, pinion gears 14 and a carrier 15. The ring gear 12 is fixed on the main shaft 10 while the sun gear 13 is disposed rotatably over the main shaft 10. The carrier 15 is also disposed rotatable over the main shaft 10 and retains rotatably the pinion gears 14, which mesh with the ring gear 12 and the sun gear 13. Also, the carrier 15 is coupled to a LOW-SECOND drive gear 16.

On the right side of the planetary gear train 11, a SECOND clutch 26, which engages and disengages the sun gear 13 to the main shaft 10, is provided on the main shaft 10. In addition, an 1-2 one-way clutch 21 and a LOW-REV clutch 23 are provided to engage and disengage the sun gear 13 to an anchoring member 20.

Furthermore, around this section of the transmission, a balancing rotating member 2 is provided rotatably, and it is engageably connected to the main shaft 10 by a 2-3 inertia clutch 25. It is also connected to the sun gear 13 by a 2-3 one-way clutch and to the sun gear 13 by a 1-2 inertia clutch 24.

The transmission further includes a countershaft 30, which is disposed rotatably in parallel with the main shaft 10. On the countershaft 30, a LOW-SECOND driven gear 31, which meshes with the LOW-SECOND drive gear 16, is provided fixedly, and a THIRD driven gear 32, which meshes with the THIRD drive gear 17, is disposed rotatably and engaged and disengaged to the countershaft 30 by a THIRD clutch 33. A final drive gear 35 is provided fixedly at the left end of the countershaft 30, and it meshes with a final driven gear 36, which has a differential mechanism 5. In this construction, the final driven gear 36 is connected to the right and left axle shafts 6a and 6b through the differential mechanism 5.

Figure 2:
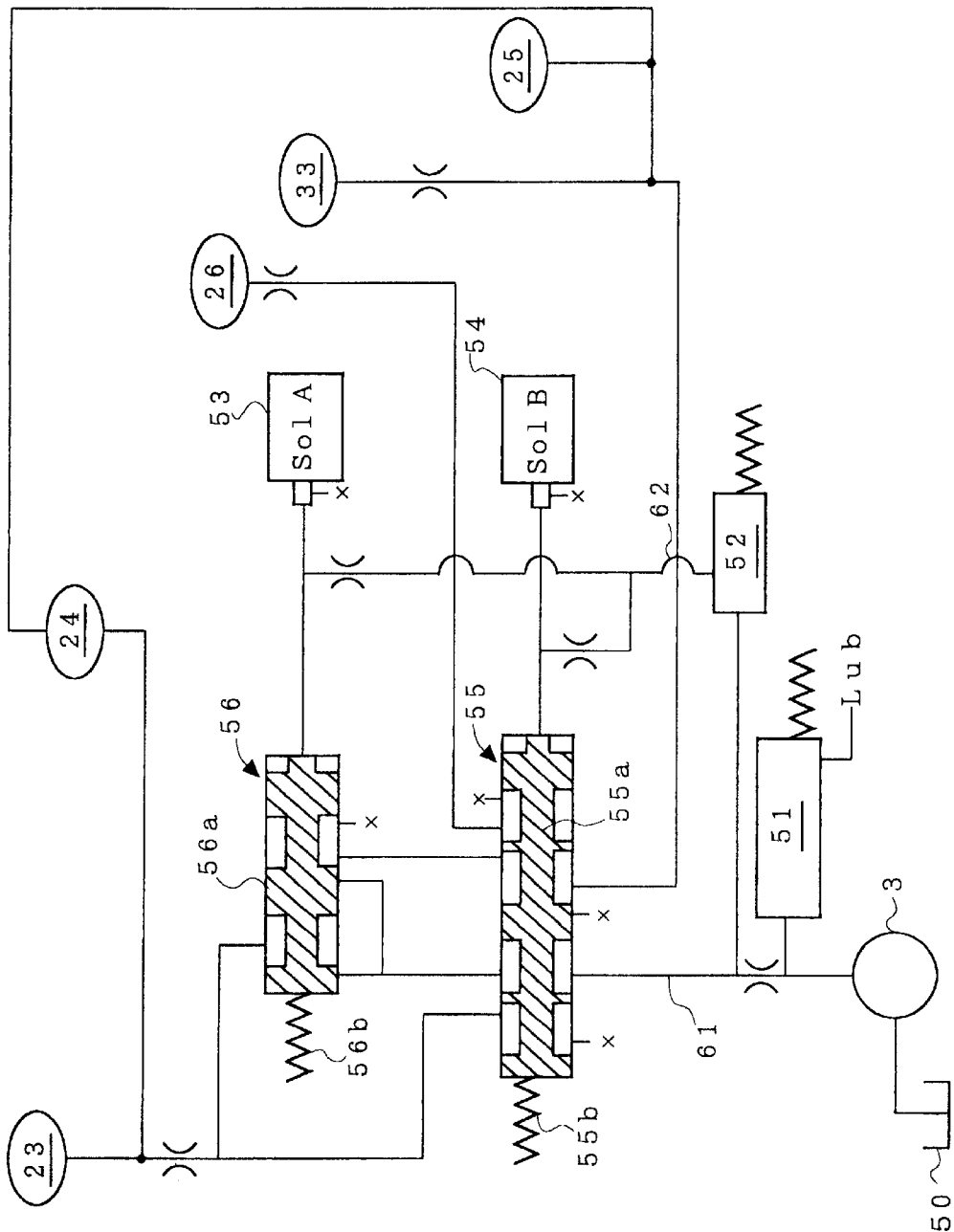
FIG. 2 is a hydraulic circuit diagram illustrating the arrangement of hydraulic valves used for controlling the shift operation of the transmission.

FIG. 2 shows the construction of a hydraulic circuit used for controlling the engagement actuations of the clutches in the shift control of the transmission. In this hydraulic circuit, oil in a tank 50 is sucked by the hydraulic pump 3 and delivered into an oil passage 61, and the pressure of the oil passage 61 is adjusted to a line pressure PL by a regulator valve 51. The oil passage 61 is connected with another oil passage 62 through a modulator valve 52. Therefore, the line pressure PL of the oil passage 61 is reduced to a modulator pressure PM, and this pressure is supplied into the oil passage 62.

As shown in FIG. 2, the oil passage 61 is connected to a 1-2-3 shift valve 55 and to a 1-2 shift valve 56. The oil passage 62 is connected to a first solenoid valve 53 (SOL A) and a second solenoid valve 54 (SOL B), and these solenoid valves 53 and 54 control the modulator pressure PM to act onto the right ends of the 1-2-3 shift valve 55 and the 1-2 shift valve 56.

The 1-2-3 shift valve 55 includes a spool 55a, which is movable and biased rightward by a spring 55b. At its right end, the 1-2-3 shift valve 55 receives the modulator pressure PM, whose supply is controlled by the second solenoid valve 54. As a result, the rightward and leftward movement of the spool 55a is controlled by the second solenoid valve 54. The 1-2 shift valve 56 also includes a spool 56a, which is movable and biased rightward by a spring 56b. At its right end, the 1-2 shift valve 56 receives the modulator pressure PM, whose supply is controlled by the first solenoid valve 53. As a result, the rightward and leftward movement of the spool 56a is controlled by the first solenoid valve 53.

As shown in FIG. 2, to oil passages extending from the 1-2-3 shift valve 55 and the 1-2 shift valve 56, the above mentioned LOW-REV clutch 23, 1-2 inertia clutch 24, SECOND clutch 26, THIRD clutch 33 and 2-3 inertia clutch 25 are connected. With this arrangement, when the first and second solenoid valves 53 and 54 are turned ON or OFF, respectively, in the shift control of the transmission, the delivery of the line pressure PL to the clutches is controlled as shown in FIG. 3 to set the speed change ratio of the transmission at the LOW, SECOND, or THIRD speed ratio, respectively. In FIG. 3, mark "O" indicates that the respective clutch is actuated for engagement while mark "X" indicates that the respective clutch is released.

At first, the establishment of the LOW speed ratio of the transmission is explained. As shown in FIG. 3, the LOW speed ratio is established when both the first and second solenoid valves 53 and 54 are turned ON to actuate the LOW-REV clutch 23 for engagement. In this condition, while the electrical motor 1 provides a driving power, the 1-2 one-way clutch 21 and the 2-3 one way clutch 22 are also both actuated for engagement. Therefore, these one-way clutches are marked by the "O" in FIG. 3.

The LOW-REV clutch 23 engages the sun gear 13 to the anchoring member 20. As the sun gear 13 is stationary, the rotation of the main shaft 10, which is driven by the electrical motor 1, is transferred to the ring gear 12 of the planetary gear train 11, and the carrier 15 is rotated in a reduced speed. In this condition, the LOW-SECOND drive gear 16, which is connected to the carrier 15, is driven at the same speed as the carrier 15. As a result, the LOW-SECOND driven gear 31, which meshes with the LOW-SECOND drive gear 16, rotates the countershaft 30. The rotation of the countershaft 30 is conveyed through the final drive gear 35 to the final driven gear 36 and then distributed to the right and left axle shafts 6a and 6b by the differential mechanism 5, driving a pair of right and left wheels (not shown).

While the transmission is set at the LOW speed ratio, the LOW-REV clutch 23 functions to fix the sun gear 13 stationary. As a result, not only the rotating members directly connected to the sun gear 13 but also the rotating members which are connected through the 1-2 one-way clutch 21 and the 2-3 one way clutch 22 to the sun gear 13, for example, the balancing rotating member 2, are held stationary. Hereinafter, the rotating members which are connected to the sun gear 13 and held stationary while the transmission is set at the LOW speed ratio are referred to as "intermediate rotating members".

Now, a description is given of the power transmission path of the transmission set at the SECOND speed ratio. As shown in FIG. 3, the SECOND speed ratio is established when both the first and second solenoid valves 53 and 54 are turned OFF to actuate the SECOND clutch 26 and the 1-2 inertia clutch 24 for engagement. In this condition, for the driving power from the electrical motor 1, the 2-3 one-way clutch 22 is actuated for engagement.

The SECOND clutch 26 engages the sun gear 13 to the main shaft 10 as shown in FIG. 1, so the sun gear 13 and the main shaft 10 rotate as a unit. As the ring gear 12 is fixed on the main shaft 10, the whole of the planetary gear train 11 rotates together with the main shaft 10. This rotation is transferred from the LOW-SECOND drive gear 16 to the LOW-SECOND driven gear 31, which rotates the countershaft 30. The rotation of the countershaft 30 is conveyed from the final drive gear 35 to the final driven gear 36 and then distributed to the right and left axle shafts 6a and 6b by the differential mechanism 5, driving the right and left wheels (not shown).

As described above, while the transmission is set at the LOW speed ratio, the sun gear 13 of the planetary gear train 11 is held stationary, and the rotation of the main shaft 10 and the ring gear 12 is transferred to the carrier 15 at an inherent reduction ratio. Then, the LOW-SECOND drive gear 16 is driven at the same rotational speed as the carrier 15. On the other hand, while the transmission is set at the SECOND speed ratio, the whole of the planetary gear train 11 rotates with the main shaft 10 as a unit, and the LOW-SECOND drive gear 16 is driven at the same rotational speed as the main shaft 10 and the planetary gear train 11. Suppose that the rotational speed of the main shaft 10 were identical for both the conditions of the transmission set at the LOW speed ratio and at the SECOND speed ratio, then the ratio between the LOW speed ratio and the SECOND speed ratio corresponds to the speed change ratio of the rotational speed of the LOW-SECOND drive gear 16 being shifted between the LOW speed ratio and the SECOND speed ratio of the transmission.

While the vehicle is traveling, though the transmission is shifted from the LOW speed ratio to the SECOND speed ratio, the speed of the vehicle will not change much. The rotating members located to the output side of the transmission, for example, the LOW-SECOND drive gear 16, rotate almost at a constant rotational speed during the shift. As a result, the rotation of the output shaft of the electrical motor 1, which is coupled with the main shaft 10, must change in correspondence to the above described speed change ratio. Simultaneously, the, sun gear 13 and the rotating members connected thereto (i.e., the intermediate rotating members), which have been fixed stationary while the transmission is set at the LOW speed ratio, must now start rotating and attain the same rotational speed as the main shaft 10 rotates when the transmission is set at the SECOND speed ratio.

To describe the above condition of the transmission more clearly, for example, the ratio of the number of teeth Z1 of the sun gear 13 of the planetary gear train 11 to the number of teeth Z3 of the ring gear 12 is assumed to be Z1:Z3=1:3. In this case, the speed change ratio between the LOW speed ratio and the SECOND speed ratio (common ratio) is 1.33. Let's suppose that while the vehicle is driving, the transmission set at the LOW speed ratio with the main shaft 10, which is driven by the electrical motor 1, rotating at a rotational speed of 6,000 rpm is shifted to the SECOND speed ratio.

Because the above described speed change ratio is 1.33, when the shift to the SECOND speed ratio is complete, the rotational speed of the main shaft 10 has changed to 4,500 rpm with a reduction of 1,500 rpm. On the other hand, the first intermediate members, which includes the sun gear 13, etc., attain a rotational speed of 4,500 rpm starting from 0 rpm. It is clear from this analysis that the energy involved in the rotational speed change of the main shaft 10 and the rotating members which rotate in synchronization the main shaft 10 and the energy involved in the rotational speed change of the intermediate rotating members work inversely to each other in direction, so these energies can offset each other.

If both the energies are equal to each other, then these energies can offset each other during the shift of the transmission, so no energy will be transmitted to the output side of the transmission. The result is a reduced shift shock. On the other hand, if there is a difference between these energies, then this energy difference is transmitted to the output side of the transmission to cause a relatively large shift shock.

In consideration of this point, this embodiment of the present invention sets the ratio of the total rotational inertia Iil of the rotating members which are coupled to the output shaft of the electrical motor 1 (these members are referred to as the drive side rotating members) to the total rotational inertia Iml of the intermediate rotating members to the reciprocal of the above described rotational speed change (1,500:4,500) experienced during the shift from the LOW speed ratio to the SECOND speed ratio of the transmission, i.e.,Iil:Iml=3:1. As a result, the energy for changing the rotational speed of the drive side rotating members from 6,000 rpm to 4,500 rpm equals the energy for changing the rotational speed of the intermediate rotating members from 0 rpm to 4,500 rpm, and the shift shock is reduced substantially.

Figure 5:
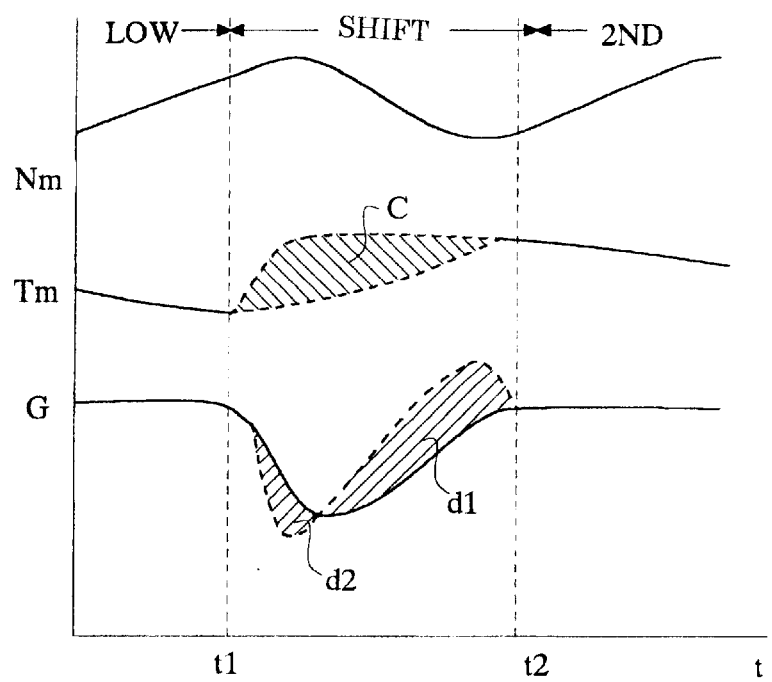
FIG. 5 is a graph describing the characteristics of the transmission for a shift operation.
Figure 6:
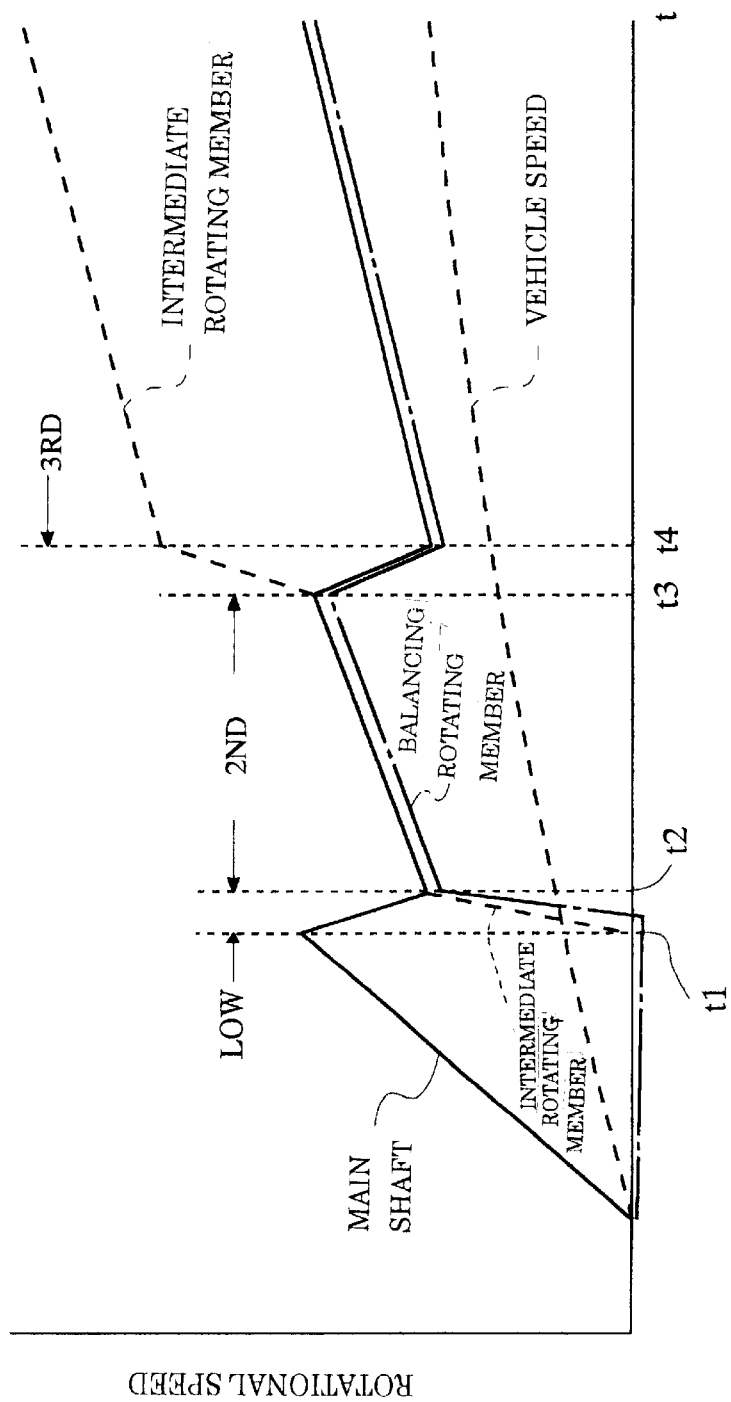
FIG. 6 is a graph describing the rotational changes of each rotating member of the transmission during the shifts.

FIGS. 5 and 6 show changes in the condition of the transmission during the shift from the LOW speed ratio to the SECOND speed ratio. In these figures, the shift from the LOW speed ratio to the SECOND speed ratio is initiated at time t1, and the shift to the SECOND speed ratio completes at time t2. The graph of FIG. 5 describes changes which occur in the rotational speed Nm, the output torque Tm and the shift shock (acceleration and deceleration) G of the output shaft of the electrical motor 1. In the figure, the change of the shift shock G of a prior art transmission is described by a broken line while the change of the shift shock G of the present invention is described by a solid line. It is clear from this graph that the shift shock of the transmission according to the present invention is restrained in regions d1 and d2 which are indicated by hatching.

Figure 4:
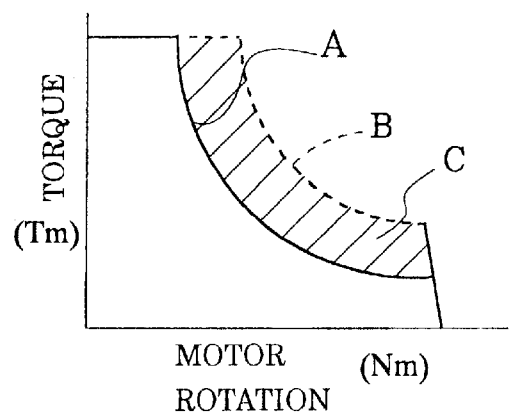
FIG. 4 is a graph describing the output characteristic of an electrical motor which constitutes the transmission.

FIG. 5 also shows the change of the torque Tm of the electrical motor during the upshift from the LOW speed ratio to the SECOND speed ratio. The solid line shows the torque Tm of the electrical motor when the shift operation is controlled to the rated torque of the electrical motor, which is represented by solid line A in FIG. 4. On the other hand, the broken line of the toque Tm in FIG. 5 indicates the change of the torque Tm while the shift operation is executed with the extra torque output of the electrical motor which is represented by broken line B in FIG. 4. The electrical motor 1 is driven with the extra torque output when the upshift is executed, to compensate the drawn-in torque experienced during the upshift. By reducing the drawn-in torque, the shift shock is further minimized. In FIG. 6, the rotational changes of the main shaft 10, the intermediate rotating members and the balancing rotating member are shown by a solid line, by a short broken line and by a one point chain line, respectively, and the speed change of the vehicle is shown by a long broken line.

Now, a description is given of the power transmission path of the transmission for the THIRD speed ratio. As shown in FIG. 3, the THIRD speed ratio is established when the first solenoid valve 53 is turned OFF, and the second solenoid valve 54 is turned ON to actuate the THIRD clutch 33a and the 2-3 inertia clutch 25 for engagement.

As shown in FIG. 1, when the THIRD clutch 33 is actuated for engagement, the rotation of the main shaft 10 is transferred from the THIRD drive gear 17 to the THIRD driven gear 32, which meshes with the THIRD drive gear 17, and then through the THIRD clutch 33 to the countershaft 30. The rotation of the countershaft 30 is further conveyed from the final drive gear 35 to the final driven gear 36 and then distributed to the right and left axle shafts 6a and 6b by the differential mechanism 5, driving the right and left wheels (not shown).

When the transmission is shifted from the SECOND speed ratio to the THIRD speed ratio, the SECOND clutch 26, which has been functioning to rotate the whole unit of the planetary gear train 11, is released. Therefore, the rotation of the countershaft 30 is transferred from the LOW-SECOND driven gear 31 to the LOW-SECOND drive gear 16, rotating the carrier 15. As a result, there is an increase in the rotational speed of the sun gear 13 and the rotating members connected thereto, i.e., the intermediate rotating members, all of which were rotating with the main shaft 10 as a unit when the transmission was set at the SECOND speed ratio. In this instance, the rotational speed of the main shaft 10 itself is reduced by the speed change ratio of the shift between the SECOND speed ratio and the THIRD speed ratio.

For this upshift, if the inertia of each member were designed to make the energy involved in the rotational speed reduction of the rotating members which are coupled to the main shaft 10, i.e., the drive side rotating members, equal to the energy involved in the rotational speed increase of the intermediate rotating members coupled to the sun gear 13, then the effect of shift shock could be minimized as in the case of the upshift from the LOW speed ratio to the SECOND speed ratio. However, in general, the speed change ratio from the LOW speed ratio to the SECOND speed ratio differs from the speed change ratio from the SECOND speed ratio to the THIRD speed ratio. In this situation, if either upshift case, i.e., the shift from the LOW speed ratio to the SECOND speed ratio or the shift from the SECOND speed ratio to the THIRD speed ratio, is handled to offset the changes of the rotational energy, then the rotational energy changes of the other upshift case is left unbalanced or not offset, the latter resulting in a relatively large shift shock.

To solve this problem, the present embodiment is arranged to actuate the 2-3 inertia clutch 25 to engage the balancing rotating member 2 to the main shaft 10 when the upshift from the SECOND speed ratio to the THIRD speed ratio is executed. In other words, the balancing rotating member 2, which is included in the intermediate rotating members when the upshift from the LOW speed ratio to the SECOND speed ratio is executed, is included in the drive side rotating members when the upshift from the SECOND speed ratio to the THIRD speed ratio is executed. Because of this arrangement, if the rotational inertia of the balancing rotating member 2 is determined appropriately to make the rotational energy change of the drive side rotating members equal to the rotational energy change of the intermediate rotating members for both the upshift cases, then the effect of shift shock as a whole can be reduced substantially.

In summary, when a transmission is shifted from a first speed ratio to a second speed ratio, the rotational speed of the drive source changes correspondingly to the ratio of the speed ratios. In the transmission according to the present invention, the ratio of the rotational inertia of the drive side rotating members to the rotational inertia of the intermediate rotating members is made equal to the reciprocal of the ratio of the rotational change of the drive source to the rotational change of the intermediate rotating members, which rotational changes occur when the shift is executed. Therefore, the energy involved in the rotational change of the drive side rotating members equals the energy involved in the rotational change of the intermediate rotating members during the shift, with the directions of the rotational changes of the drive side rotating members and the intermediate rotating members being opposite to each other. As a result, these energies can offset each other, so the energies of these rotational changes are not transferred to the output rotating members of the transmission. Thus, the effect of shift shock is restrained to realize a smooth shift operation for the transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2000-216915 filed on Jul. 18, 2000 which is incorporated herein by reference.

What is claimed is:

1. A transmission comprising a drive source and an output rotating member, in which a power from said drive source is transferred to said output rotating member with a speed change; and further comprising a drive side rotating member and an intermediate rotating member, said drive side rotating member being coupled to said drive source and experiencing a rotational change along with said drive source when a shift from a first speed ratio to a second speed ratio is executed, and said intermediate rotating member being positioned between said drive side rotating member and said output rotating member and experiencing a rotational change in a direction opposite to that of said drive side rotating member when said shift is executed;

wherein:

a ratio of a rotational inertia of said drive side rotating member to a rotational inertia of said intermediate rotating member is a reciprocal of a ratio of said rotational change of said drive source to said rotational change of said intermediate rotating member.

2. The transmission as set forth in claim 1, further comprising a main shaft, which is coupled to said drive source, a planetary gear train, which is provided on said main shaft, and a countershaft, which is disposed parallel with said main shaft and connected to said output rotating member;

wherein:

said planetary gear train comprises a ring gear, which is coupled to said main shaft, and a sun gear and a carrier, each of which is provided rotatably over said main shaft, said carrier being coupled to a LOW-SECOND drive gear as one body, which meshes with a LOW-SECOND driven gear coupled to said countershaft as one body; and said transmission further comprises a SECOND clutch which engages and disengages said main shaft to said sun gear, said sun gear being connected through a 1-2 one-way clutch to an anchoring member and engaged and disengaged by a LOW-REV clutch to said anchoring member.

3. The transmission as set forth in claim 2, wherein:

a LOW speed ratio is established by releasing said SECOND clutch and activating said LOW-REV clutch for engagement; and a SECOND speed ratio is established by releasing said LOW-REV clutch and activating said SECOND clutch for engagement.

4. The transmission as set forth in claim 2, further comprising:

a THIRD drive gear being coupled to said main shaft;

a THIRD driven gear which meshes with said THIRD drive gear and provided rotatably on said countershaft and engaged and disengaged by a THIRD clutch to said countershaft; and a balancing rotating member which is engaged and disengaged by a 2-3 inertia clutch to said main shaft, coupled through a 2-3 one-way clutch to said sun gear and engaged and disengaged by a 1-2 inertia clutch to said sun gear.

5. The transmission as set forth in claim 4, wherein:

a SECOND speed ratio is established by releasing said LOW-REV clutch and said THIRD clutch and by activating said SECOND clutch for engagement;

a THIRD speed ratio is established by releasing said LOW-REV clutch and said SECOND clutch and by activating said THIRD clutch for engagement;

when said SECOND speed ratio is established, said 1-2 inertia clutch is activated for engagement while said 2-3 inertia clutch is released; and when said THIRD speed ratio is established, said 2-3 inertia clutch is activated for engagement while said 1-2 inertia clutch is released.

\* \* \* \* \*